Patented Oct. 18, 1938

2,133,889

UNITED STATES PATENT OFFICE 2,133,889

METHOD OF TREATING CHINA-WOOD OIL AND PRODUCT THEREOF

Robert D. Bonney, Glen Ridge, and Walter S. Egge, East Orange, N. J., assignors to Congoleum-Nairn Inc., a corporation of New York No Drawing. Application February 16, 1935, Serial No. 6,884

14 Claims. (Cl. 87—12)

The present invention relates to the treatment of China-wood oil or tung oil for the purpose of rendering it especially adaptable for use as a vehicle either alone or in combination with other vehicles in the manufacture of protective coating compositions, adhesive compositions, and as a binder for mouldable compositions. The invention contemplates as a new and highly useful product an oxidized China-wood oil in fluid phase distinguished by its properties, characteristics, and behavior from heat treated China-wood oil products heretofore known.

According to prior art practices, China-wood oil has, with few exceptions, been prepared for use in coating compositions by heat treatment at relatively high temperatures i. e. 400° F. to 550° F. In some cases the oil is treated alone but more frequently natural or synthetic resins, particularly acid resins, are added to the oil before, during, or at the completion of the heat treatment for the two-fold purpose of preventing coagulation of the oil and of most effectively incorporating the resin with the oil. A suitable thinning medium such as turpentine or petroleum solvent is added to the heat treated oil to reduce its viscosity to the desired consistency for use in coating compositions. Suitable driers, including compounds of lead, manganese, and cobalt may be cooked with the oil or may be added to the heat treated oil with the solvent thinner. The use of a resin or resin acid is considered necessary in most commercial heat treatment practices to prevent the gelation of the oil to a solid mass which is useless in the preparation of paints and varnishes. Likewise, care is usually taken to prevent access of air or oxygen to the oil while it is undergoing the heat treatment or otherwise "skinning" or coagulation of the oil will take place in local areas where contact with air or oxygen occurs.

The preparation of an unadulterated highly oxidized but still fluid China-wood oil substantially free from non-hardening diluents, as distinguished from heat treated China-wood oil products and from composite mixtures of China-wood oil and non-drying oils, has heretofore never been achieved so far as applicants are aware. As is well known, China-wood oil is composed essentially of the glycerides of alpha and beta eleostearic acids. These unsaturated carbon chain acids comprise three double bonds two of which are adjacent forming what is commonly known as a conjugate linkage. This conjugation of double bonds causes China-wood oil to be very active toward oxygen. Thus, when raw China-wood oil is blown with air at a temperature of 140° to 160° F. it absorbs oxygen very rapidly but the oxidized glycerides are almost immediately converted from the fluid phase to the solid or "linoxyn" phase. Thus when the oil is air blown coagulated masses or "skins" begin to form at once and even before oxidation has proceeded to any substantial extent, the entire mass is transformed into a gel or semi-solid. The presence of resin or resin acids somewhat retards the gelation but not sufficiently to permit any material oxidation of the oil to take place before the mixture solidifies. Because of this very rapid coagulation of the oxidized glycerides of the eleostearic acids the commercial preparation of highly oxidized China-wood oil in fluid phase has heretofore been considered impossible.

We have now discovered a novel treatment of China-wood oil whereby the oil may be processed at elevated but relatively low temperatures i. e. below 250° F. and whereby a highly oxidized oil product may be prepared in the fluid or ungelled phase, such product exhibiting film-forming properties which are markedly superior to the film-forming properties of heat treated oils heretofore known. Essentially our invention is based upon two discoveries; the first, that if China-wood oil is admixed with certain dispersive diluents which are non-volatile at processing temperatures the oil may be highly oxidized by aeration in the conventional manner of air-blowing drying oils at elevated temperatures, without the gelation or solidification which occurs when China-wood oil alone is subjected to the oxidizing treatment; and the second, that fluid oxidized China-wood oil obtained by the oxidizing treatment, is insoluble in alcohol which property facilitates separation of the dispersive diluent therefrom by selective extraction.

By way of illustrating one preferred embodiment of our method invention we give the following specific example:

To four parts by weight of raw China-wood oil is added one part by weight of castor oil. The mixture is heated to about 160° F. and .5% of lead naphthenate is added. The batch is then aerated at a temperature of 140° to 160° F. for a period of about twenty hours until the oil becomes very viscous. When a tested sample just fails to completely dissolve in toluene, the oxidation is discontinued. The batch is then cooled to about 70° F. and to it is added twice its volume of denatured alcohol. The castor oil is readily soluble in the alcohol while the oxidized China-wood oil is substantially completely insoluble. The mixture of oxidized China-wood oil, castor oil and the denatured alcohol is thoroughly agitated and then allowed to separate into two layers. The upper layer will consist of alcohol in which is dissolved the castor oil diluent, while the bottom layer consists of the oxidized China-wood oil and a small quantity of occluded alcohol. The upper layer is removed by decantation and the extraction process repeated to insure adequate separation. The oxidized China-wood oil is then dissolved in an appropriate solvent such as toluene, xylene, butyl acetate, etc. to form a 50% solution in which form it may be kept indefinitely without gelation. If the presence of the small amount of occluded alcohol in the oxidized China-wood oil is undesirable for any reason, it is removed by fractional distillation of the toluene solution.

Castor oil is the preferred diluent for admixture with the China-wood oil. It functions apparently as a dispersive agent for the oxidized glycerides of the eleostearic acids thereby preventing coagulation of these oxidized glycerides and although it probably undergoes some oxidation during the oxidizing treatment of the China-wood oil, it nevertheless remains entirely soluble in alcohol and may be easily and completely separated from the oxidized China-wood oil by selective solvent extraction. Olive oil also functions very satisfactorily and in fact we have found that any non-drying vegetable oil which is soluble in alcohol will serve the purpose. Among such non-drying oils are included palm oil, peanut oil, pecan oil, and cocoanut oil. Other suitable dispersive diluents non-volatile at processing temperatures, which function in a similar manner include the alcohol-soluble fatty acids of drying, semi-drying, and non-drying oils. Such substances are "non-hardening," that is, they are incapable of hardening by oxidation or by evaporation of a volatile solvent therefrom. In general it may be said that any substance which will prevent the gelation of the oxidized China-wood oil and which itself is soluble in alcohol, will function satisfactorily as a dispersive diluent in practicing the process of our invention. The proportion of dispersive diluent may be varied from 10% to 30% by weight of China-wood oil treated. The greater the desired degree of oxidation of the China-wood oil the higher will be the proportion of diluent required. On the other hand, where resins or resin acids are admixed with the China-wood oil prior to or during the oxidation process, as hereinafter more fully described, a smaller percentage of the dispersive diluent will be found adequate to prevent coagulation.

The oxidation of the China-wood oil-diluent mixture is preferably conducted within the temperature range 120° to 160° F. The period of oxidation may be varied depending upon the degree of oxidation of the oil desired and upon the aerating efficiency of the equipment employed. Usually it will be found desirable to blow the oil with air or other oxygen-containing gas for a period of at least ten hours but not substantially more than twenty to twenty-five hours. The toluene test may be used to determine the maximum degree of oxidation obtainable while the oxidized China-wood oil still remains in the fluid phase. So long as no coagulation of the oxidized glycerides of the eleostearic acids occurs, the constituents of the batch undergoing treatment will be found to be completely soluble in toluene. With the commencement of coagulation, however, the toluene tested sample will yield a precipitate.

The separation of the oxidized China-wood oil and the dispersive diluent is accomplished by selective extraction and the preferred extracting solvents are ethyl alcohol, denatured ethyl alcohol, and methyl alcohol. These alcohols have no substantial solvent effect on either raw or oxidized China-wood oil but rapidly and completely dissolve the preferred dispersive diluents employed to maintain the oxidized China-wood oil in fluid phase during the oxidizing treatment. Other solvents possessing the equivalent characteristics of selective solvent action may be used. When the separation of oxidized China-wood oil and diluent is effected by an alcohol solvent, it will be found that the oxidized China-wood oil will occlude 10% to 15% by weight of the alcohol. Such occluded alcohol aids in preventing premature gelation of the oxidized oil prior to the addition of one of the common protective coating solvents such as toluene, xylene, or butyl acetate. In many cases the presence of this small quantity of alcohol is not objectionable and it may form a portion of the solvent component in the ultimate protective coating composition. In those cases, however, where the oxidized China-wood oil is to be admixed with other vehicles, such as chlorinated rubber, which are insoluble in alcohol, the alcohol may be removed from the toluene solution of the oxidized China-wood oil by fractional distillation.

The foregoing description of our method invention has concerned the treatment of China-wood oil alone. We have also found that many natural and synthetic resins may be advantageously combined with the oil during the oxidation process. Such resin should be relatively insoluble in the selective extraction solvent. Thus where ethyl or methyl alcohol are employed for this purpose the choice of the resin to be combined with the oil will be made on the basis of its alcohol insolubility. Among the resins which we have found to be particularly adapted for combination with the oxidized China-wood oil, are the alcohol insoluble resins of the following classes; para coumaron, ester gum, synthetic phenol-aldehyde resins, and rosin-modified phenol-aldehyde synthetic resins. When it is desired to incorporate with the oxidized China-wood oil natural or synthetic resins or gums which are soluble in the selective extraction solvent, this may, of course, be done by simply adding a solution of the desired resin to the solution of the oxidized China-wood oil after completion of the extraction process.

In certain cases there is a particular advantage in combining the selected resin with the oil during the oxidation process. Thus we have found that certain resins such as para coumaron and numerous synthetic oil-soluble or oil-reactive phenol-aldehyde resins, which are normally incompatible with specific vehicles such as cellulose nitrate, may be readily incorporated with such vehicles by adding the resin to the China-wood oil diluent mixture before oxidation, oxidizing the mixture of oil-resin and diluent, and, after separation of the diluent, admixing the oxidized oil-resin composition with the cellulose nitrate vehicle in the presence of a common solvent.

The China-wood oil product prepared in accordance with our invention is distinguished from raw or heat treated China-wood oils by its physical properties, its characteristics, and its behavior. The following comparative data indicates the nature and degree of change in physical properties of the oil treated as described in the specific example given above.

| | Raw China-wood oil | Oxidized China-wood oil |
|---|---|---|
| Specific gravity, 15.5° C./15.5° C. | 0.940 | 0.980 |
| Iodine number (Wijs) | 170 | 108 |
| Saponification number | 190 | 189 |
| Index of refraction at 25° C. | 1.5178 | 1.5085 |
| Acid number | 4.00 | 0.42 |

The specific gravity, the iodine number, and the acid number are measures of the degree of oxidation of the oil. In nearly all cases it will be found desirable to carry the oxidation to such an extent that the iodine number is reduced to 125 or below and preferably below 110. Likewise, the degree of oxidation will be such that the specific gravity of the oxidized oil will be increased to above .970 and preferably above .975. The acid number of the oil is materially reduced by the oxidizing process so that the acid number of the oxidized oil is substantially less than the acid number of the oil before oxidation. In most cases the acid number of the oxidized oil prepared by our process will be found to be less than one. The most remarkable characteristic of the fluid oxidized China-wood oil of our invention is its film-forming behavior. Thus, without further substantial oxidation but simply upon the evaporation of the volatile thinner it hardens to a lustrous film more rapidly and more uniformly than any heat treated China-wood oil heretofore known. This property distinguishes the oxidized China-wood oil of our invention from oil which has been simply heat treated since all heat treated oils, so far as we are aware, require the presence of oxygen to become fully hardened either at atmospheric or elevated temperatures. Furthermore, when applied in thin films as in the case of protective coatings the oxidized China-wood oil of our invention may be fully hardened at atmospheric temperature with no accompanying shrivelling or frosting. It is pale in color, thus rendering it suitable as a vehicle for clear protective coatings.

We have found a wide range of uses for this fluid highly oxidized China-wood oil. Thus it may be employed as the vehicle either with or without the addition of synthetic or natural resins in the preparation of various industrial protective coating compositions of either the baking or air drying types. In such compositions it is markedly superior to other oxidized drying oils with respect to its greater resistance to water, moisture, dilute acid, and alkalies. It is compatible in all proportions with cellulose esters, as for example nitro-cellulose, and with chlorinated rubber and may be employed either as a plasticizer therefor or to form therewith composite vehicles for the preparation of a wide variety of special protective coating compositions. In such composite vehicles the fluid oxidized China-wood oil is much to be preferred over other oxidized or heat treated drying or semi-drying oils because of its relatively high resistance to alkalies. Likewise it is much to be preferred over heat bodied China-wood oils since it does not require further substantial oxidation to harden, whereas heat treated oils undergo considerable oxidation during and after hardening with an accompanying embrittlement of vehicles comprising the same. The novel product of our invention may also be used in the formulation of adhesives and as a binder for mouldable compositions. Thus, in the manufacture of linoleum it may be substituted for the usual oxidized linseed oil binder and may be combined with wood flour, ground cork, mineral fillers, pigments, etc. to produce a mouldable and heat-hardenable linoleum-like product characterized by its high resistance to the deleterious action of washing soaps and other alkaline solutions.

It will be understood that the specific details of the method hereinbefore set forth are for the purposes of illustration and are not intended to be regarded as a limitation upon the scope of the invention except as they may be particularly included in the following claims. Also such claims as are directed to the product invention are intended to cover the oxidized China-wood oil both when used alone and when used in combination with other vehicles in the manufacture of protective coating compositions, mouldable compositions, adhesives, etc.

We claim:

1. The process of treating China-wood oil which comprises the steps of admixing the China-wood oil with castor oil, subjecting the mixture at an elevated temperature but below 250° F. to an oxidizing treatment limited substantially to the formation of uncoagulated products of oxidation, and extracting with alcohol the mixture of fluid oxidized China-wood oil and castor oil to separate the castor oil therefrom, the castor oil being present during the oxidation step in an amount that is effective to substantially retard the coagulation of the China-wood oil, a sufficient amount of said alcohol remaining occluded by said oxidized China-wood oil to maintain said oxidized China-wood oil in fluid condition during and at the conclusion of said extraction operation.

2. The process of treating China-wood oil which comprises the steps of admixing with the China-wood oil 10% to 30% of an alcohol-soluble dispersive diluent non-volatile at processing temperatures, subjecting the mixture at an elevated temperature but below 250° F. to an oxidizing treatment limited substantially to the formation of uncoagulated products of oxidation, and extracting with alcohol the mixture of fluid oxidized China-wood oil and diluent to separate the diluent therefrom, a sufficient amount of said alcohol remaining occluded by said oxidized China-wood oil to maintain said oxidized China-wood oil in fluid condition during and at the conclusion of said extraction operation.

3. The process of treating China-wood oil which comprises the steps of admixing with the China-wood oil 10–30% of a diluent selected from the group consisting of alcohol-soluble non-drying vegetable oils and alcohol-soluble fatty acids of drying, semi-drying and non-drying oils, subjecting the mixture at an elevated temperature but below 250° F. to an oxidizing treatment limited substantially to the formation of uncoagulated products of oxidation, extracting with alcohol the mixture of fluid oxidized China-wood oil and diluent to separate the diluent therefrom.

4. The process of treating China-wood oil which comprises the steps of admixing the China-wood oil with 10–30% of an alcohol-soluble non-drying vegetable oil, subjecting mixture at an elevated temperature but below 250° F. to an oxidizing treatment limited substantially to the formation of uncoagulated products of oxidation, and extracting with alcohol the mixture of fluid oxidized China-wood oil and non-drying vegetable oil to separate the latter therefrom.

5. The process of treating China-wood oil which comprises the steps of admixing the China-wood oil with 10–30% of castor oil, aerating the mixture of China-wood oil and castor oil with an oxygen-containing gas and within the temperature range of 120° F. to 160° F., discontinuing the oxidation prior to the formation of coagulated products of oxidation, and extracting with alcohol the mixture of fluid oxidized China-wood oil and castor oil to separate and remove the castor oil therefrom.

6. The process of treating China-wood oil which comprises the steps of admixing with the China-wood oil a resin and 10–30% of an alcohol-soluble non-drying vegetable oil non-volatile at processing temperatures, subjecting the mixture at an elevated temperature but below 250° F. to an oxidizing treatment limited substantially to the formation of uncoagulated products of oxidation, and extracting with alcohol the mixture of fluid oxidized China-wood oil, resin and non-drying vegetable oil to separate such non-drying vegetable oil therefrom.

7. The process of treating China-wood oil which comprises the steps of admixing the China-wood oil with a resin and castor oil, subjecting the mixture at an elevated temperature but below 250° F. to an oxidizing treatment limited substantially to the formation of uncoagulated products of oxidation, extracting with alcohol the mixture of fluid oxidized China-wood oil, resin and castor oil to separate the castor oil therefrom, the castor oil and resin being present during the oxidation step in an amount that is effective to substantially retard the coagulation of the China-wood oil.

8. A composition comprising uncoagulated oxidized China-wood oil in liquid phase, having a specific gravity above 0.970 at 15.5° C./15.5° C., having an iodine number below 125 (Wijs), being substantially free of non-hardening diluents of low volatility, being capable of hardening without further substantial oxidation, containing sufficient of a substance selected from the group consisting of alcohol and solvents for the oxidized oil to preserve the fluidity of the oxidized oil, and being substantially identical with the product of the process of claim 1.

9. The process of treating China-wood oil which comprises the steps of admixing the China-wood oil with an organic non-hardening dispersive diluent which at processing temperatures is substantially non-volatile and remains in liquid condition and which is soluble in a liquid aliphatic alcohol that is a non-solvent for fluid oxidized China-wood oil, subjecting the mixture at an elevated temperature but below 250° F. to an oxidizing treatment until the iodine number is lowered to at most 125 but limited substantially to the formation of uncoagulated products of oxidation of said China-wood oil dispersed in said diluent in liquid phase, said diluent being effective in the amount used to afford said oxidation of the China-wood oil without substantial coagulation of said China-wood oil during the oxidation treatment, separating the diluent from the resulting mixture of liquid oxidized China-wood oil and diluent by extracting the mixture with a liquid aliphatic alcohol having greater solvent power for the diluent than for the liquid oxidized oil leaving a small amount of said alcohol occluded in the separated liquid oxidized China-wood oil, and dissolving the separated liquid oxidized China-wood oil and occluded alcohol in a solvent having greater solvent power for said liquid oxidized China-wood oil than said alcohol.

10. The process of treating China-wood oil which comprises the steps of admixing the China-wood oil with an organic non-hardening dispersive diluent which is substantially non-volatile at processing temperatures and which is adapted to remain in liquid phase throughout the oxidation step, subjecting the mixture at an elevated temperature but below 250° F. to an oxidizing treatment until the iodine number of the China-wood oil is lowered to at most 125 but limited substantially to the formation of uncoagulated products of oxidation of said China-wood oil dispersed in said liquid diluent, said diluent being effective in the amount used to afford said oxidation of the China-wood oil without substantial coagulation of said China-wood oil during said oxidation treatment, and separating the diluent from the resulting mixture of liquid oxidized China-wood oil and diluent by extracting the mixture with a solvent having greater solvent power for the diluent than for the liquid oxidized oil.

11. The process of treating China-wood oil which comprises the steps of admixing the China-wood oil with a dispersive diluent which is substantially non-volatile at processing temperatures and which is adapted to remain in liquid phase throughout the oxidation step, subjecting the mixture at an elevated temperature but below 250° F. to an oxidizing treatment limited substantially to the formation of uncoagulated products of oxidation of said China-wood oil dispersed in said diluent, said diluent being effective in the amount used to afford said oxidation of said China-wood oil occurring in the oxidation step substantially beyond the amount of oxidation at which the China-wood oil would coagulate in the absence of said diluent, and separating said diluent from the resulting mixture of liquid oxidized China-wood oil and diluent by extracting said mixture with a volatile solvent having greater solvent power for said diluent than for said liquid oxidized China-wood oil, said oxidized China-wood oil being maintained in liquid condition by the occlusion of sufficient of said volatile solvent to maintain said oxidized China-wood oil in said fluid condition when separated from said diluent.

12. The process of claim 9 in which the said alcohol is subsequently removed from the resulting mixture of liquid oxidized China-wood oil and said solvent for the liquid oxidized China-wood oil.

13. A composition comprising uncoagulated oxidized China-wood oil in liquid phase, having a specific gravity above 0.970 at 15.5° C./15.5° C., having an iodine number below 125 (Wijs), being substantially free of non-hardening diluents of low volatility, containing sufficient volatile diluent to preserve the fluidity of the oxidized China-wood oil, and being capable of becoming hardened without further substantial oxidation upon evaporation of said volatile diluent.

14. A composition comprising uncoagulated oxidized China-wood oil in liquid phase, having a specific gravity greater than 0.975 at 15.5 C./15.5° C., having an iodine number below about 110 (Wijs), having an acid number less than about 1, being substantially free of non-hardening diluents of low volatility, containing sufficient volatile diluent to preserve the fluidity of the oxidized China-wood oil and being capable of becoming hardened without further substantial oxidation.

ROBERT D. BONNEY.
WALTER S. EGGE.